US012228102B2

(12) United States Patent
Maeda

(10) Patent No.: US 12,228,102 B2
(45) Date of Patent: Feb. 18, 2025

(54) CONTROL METHOD, CONTROLLER, AND CONTROL PROGRAM FOR CONTROLLING STARTING SYSTEM, COMPUTER-READABLE MEDIUM CARRYING CONTROL PROGRAM, STARTING SYSTEM, AND VEHICLE

(71) Applicant: VOLVO TRUCK CORPORATION, Gothenburg (SE)

(72) Inventor: Kotaro Maeda, Ageo (JP)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/043,772

(22) PCT Filed: Sep. 4, 2020

(86) PCT No.: PCT/JP2020/033623
§ 371 (c)(1),
(2) Date: Mar. 2, 2023

(87) PCT Pub. No.: WO2022/049730
PCT Pub. Date: Mar. 10, 2022

(65) Prior Publication Data
US 2023/0313772 A1 Oct. 5, 2023

(51) Int. Cl.
*F02N 7/08* (2006.01)
*F02N 11/08* (2006.01)

(52) U.S. Cl.
CPC ............ *F02N 7/08* (2013.01); *F02N 11/0814* (2013.01); *F02N 2300/2002* (2013.01)

(58) Field of Classification Search
CPC .................. F02N 7/08; F02N 11/0814; F02N 2300/2002; F02N 2011/0881
See application file for complete search history.

(56) References Cited

U.S. PATENT DOCUMENTS 3,967,132 A * 6/1976 Takamine .............. F02D 17/00 60/404
4,495,905 A 1/1985 Morishita et al.
(Continued)

FOREIGN PATENT DOCUMENTS

DE 102011105006 A1 10/2012
JP 2298664 A 12/1990
(Continued)

OTHER PUBLICATIONS

Machine translation, Detailed Description of JPH02-298664A, published Dec. 1990, obtained from https://worldwide.espacenet.com/, pp. 1-3. (Year: 1990).*
(Continued)

*Primary Examiner* — Grant Moubry
(74) *Attorney, Agent, or Firm* — Venable LLP; Jeffri A. Kaminski

(57) ABSTRACT

A starting system of an engine mounted on a vehicle includes an air reservoir; an air motor driven by compressed air supplied from the air reservoir; a battery; an electric motor driven by electric power from the battery; and an electronic control unit. The electronic control unit performs the step of controlling the air motor and/or the electric motor so that the engine is started by at least one, determined in accordance with an air pressure in the air reservoir, of an output of the air motor and an output of the electric motor.

12 Claims, 11 Drawing Sheets

(56) References Cited

U.S. PATENT DOCUMENTS

| | | | | |
|---|---|---|---|---|
| 4,543,923 | A | 10/1985 | Hamano et al. | |
| 4,747,270 | A * | 5/1988 | Klie | F02B 21/00 123/179.31 |
| 9,745,940 | B2 * | 8/2017 | Morris | E02F 9/2246 |
| 2015/0052889 | A1 * | 2/2015 | Krittian | F02N 9/04 60/596 |
| 2015/0247509 | A1 | 9/2015 | Morris et al. | |
| 2018/0162369 | A1 * | 6/2018 | Colavincenzo | B60L 15/2054 |

FOREIGN PATENT DOCUMENTS

| | | | | |
|---|---|---|---|---|
| JP | 4-71769 | U | 6/1992 | |
| JP | 200548632 | A | 2/2005 | |
| JP | 200957946 | A | 3/2009 | |
| JP | 6537661 | B1 | 7/2019 | |
| WO | WO-2013167795 | A1 * | 11/2013 | F02N 7/08 |

OTHER PUBLICATIONS

Machine translation, Detailed Description of JP2005-048632A, published Feb. 2005, obtained from https://worldwide.espacenet.com/, pp. 1-3. (Year: 2005).*

International Search Report and Written Opinion in corresponding International Application No. PCT/JP2020/033623 mailed Oct. 27, 2020 (11 pages).

European Extended Search Report dated May 17, 2024 in corresponding European Patent Application No. 20952465.1, 7 pages.

* cited by examiner

[Fig. 1]
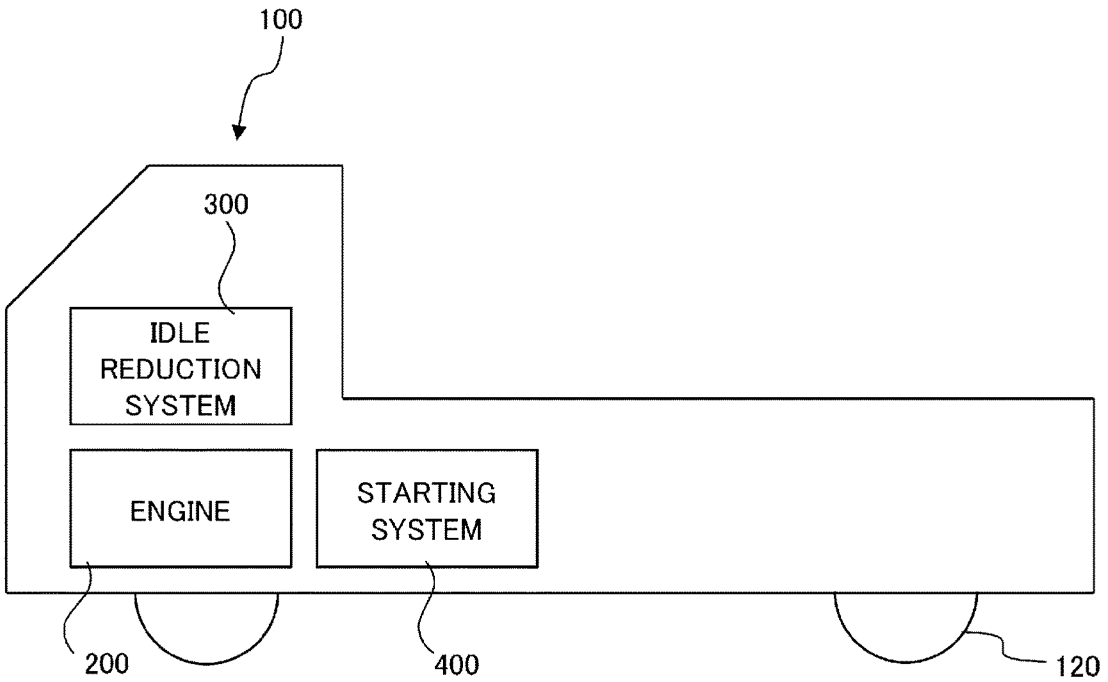
[Fig. 2]
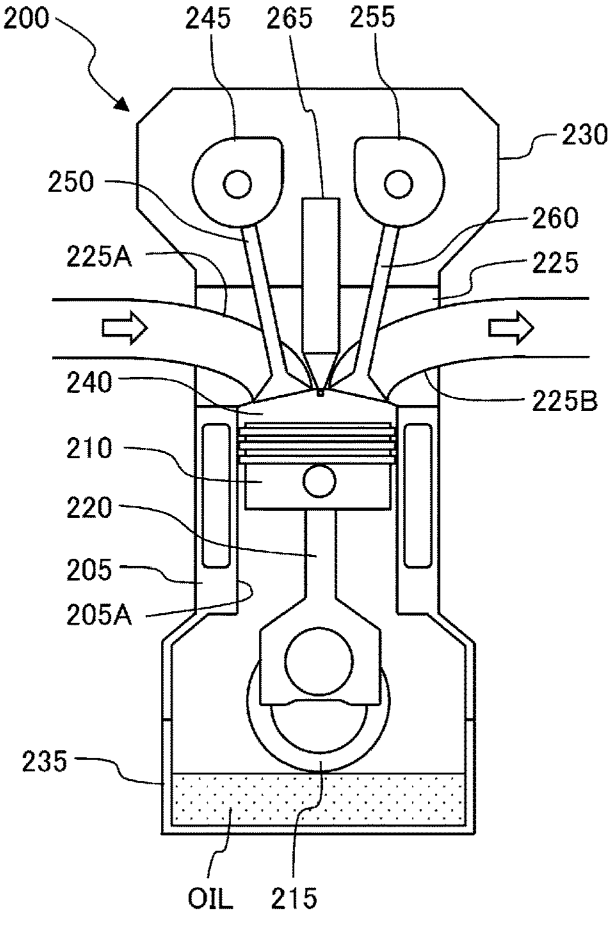

[Fig. 3]
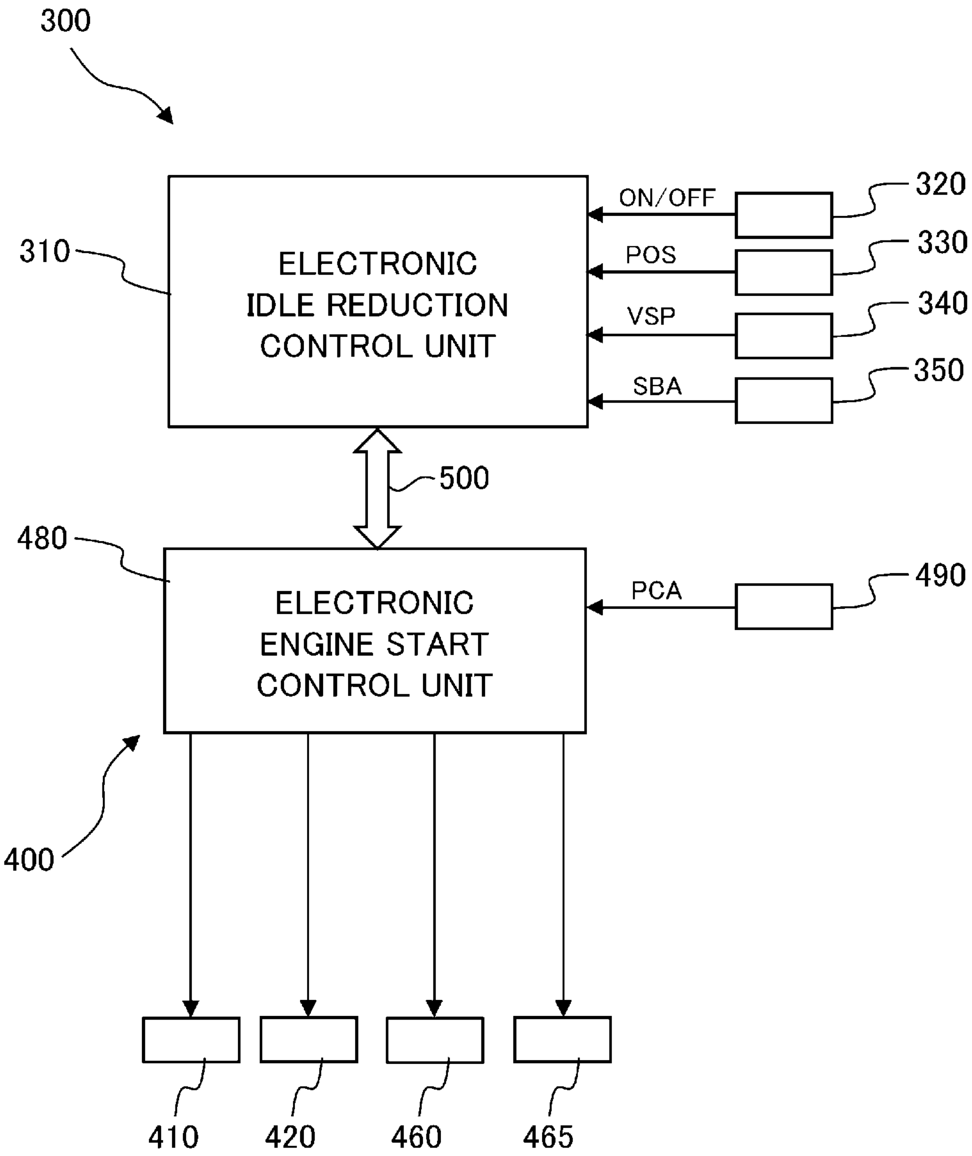

[Fig. 4]
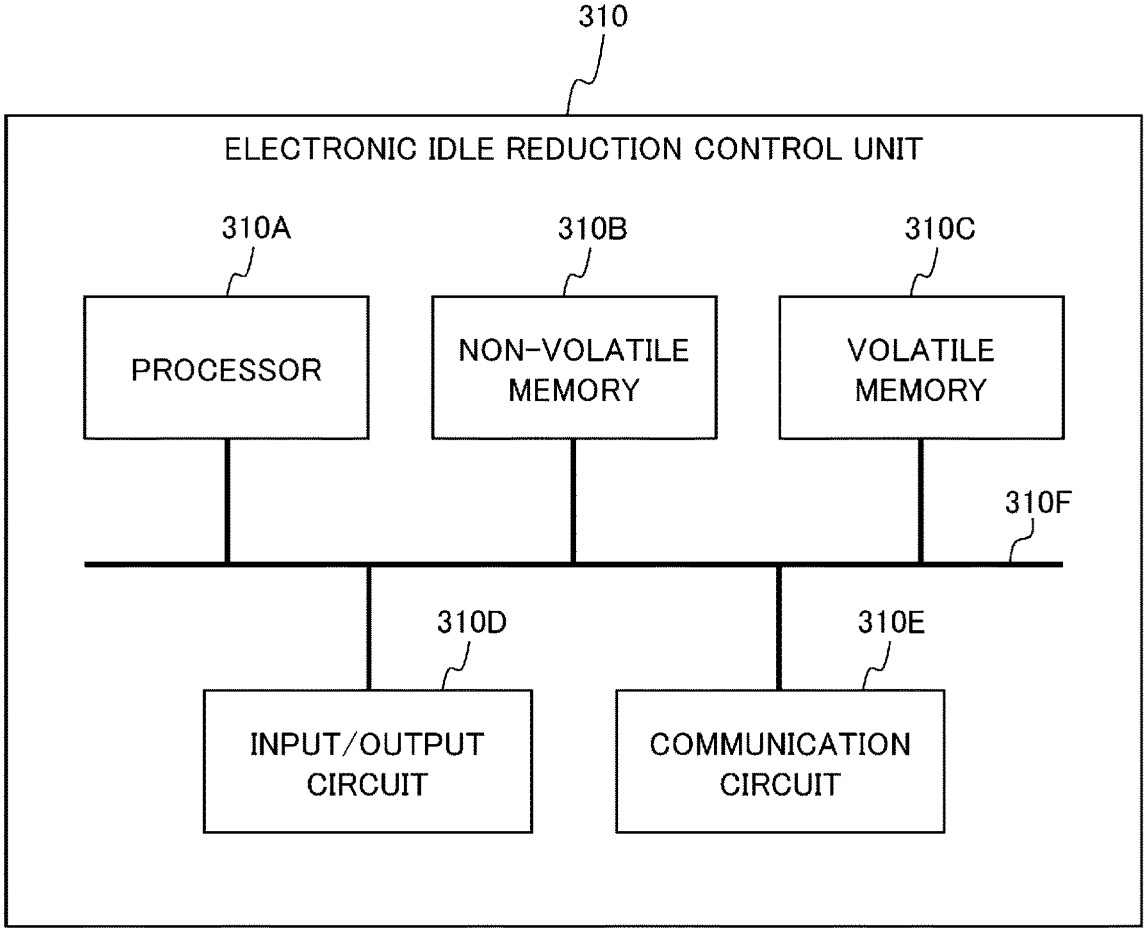

[Fig. 5]
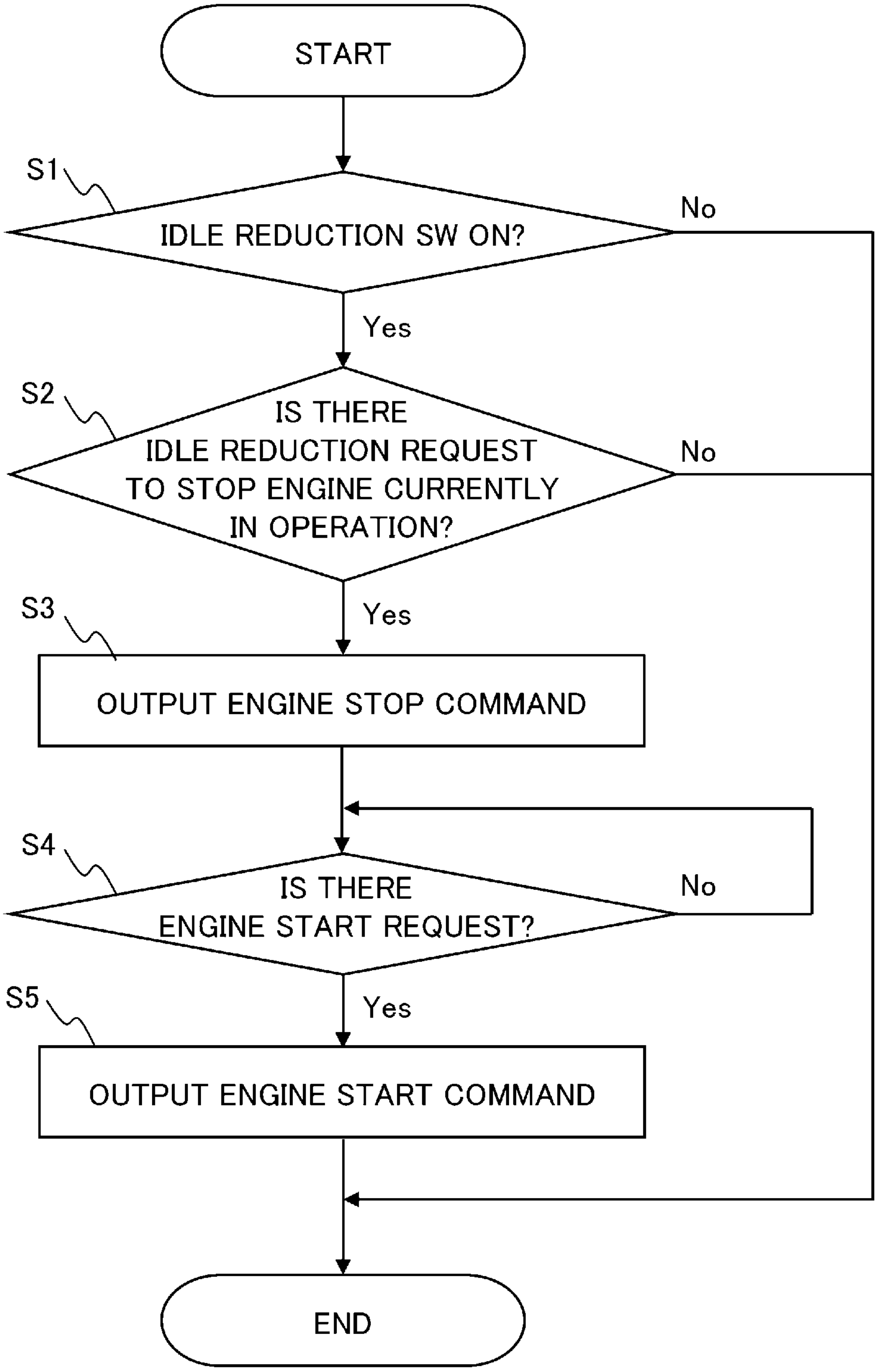

[Fig. 6]
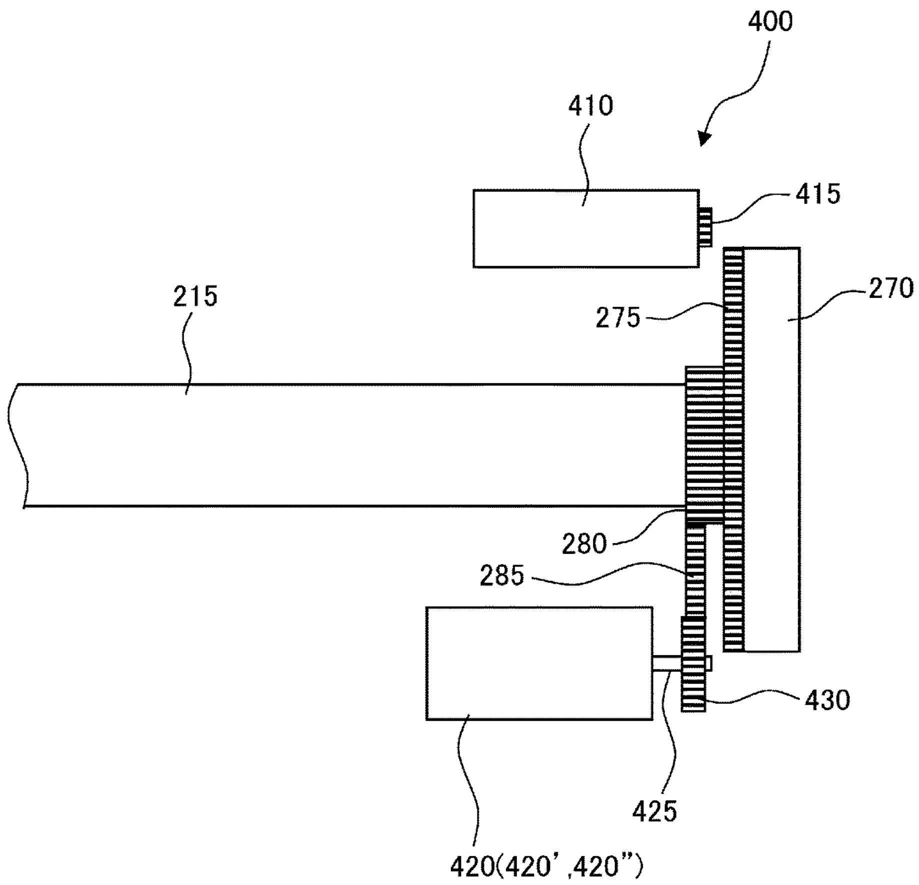
[Fig. 7]
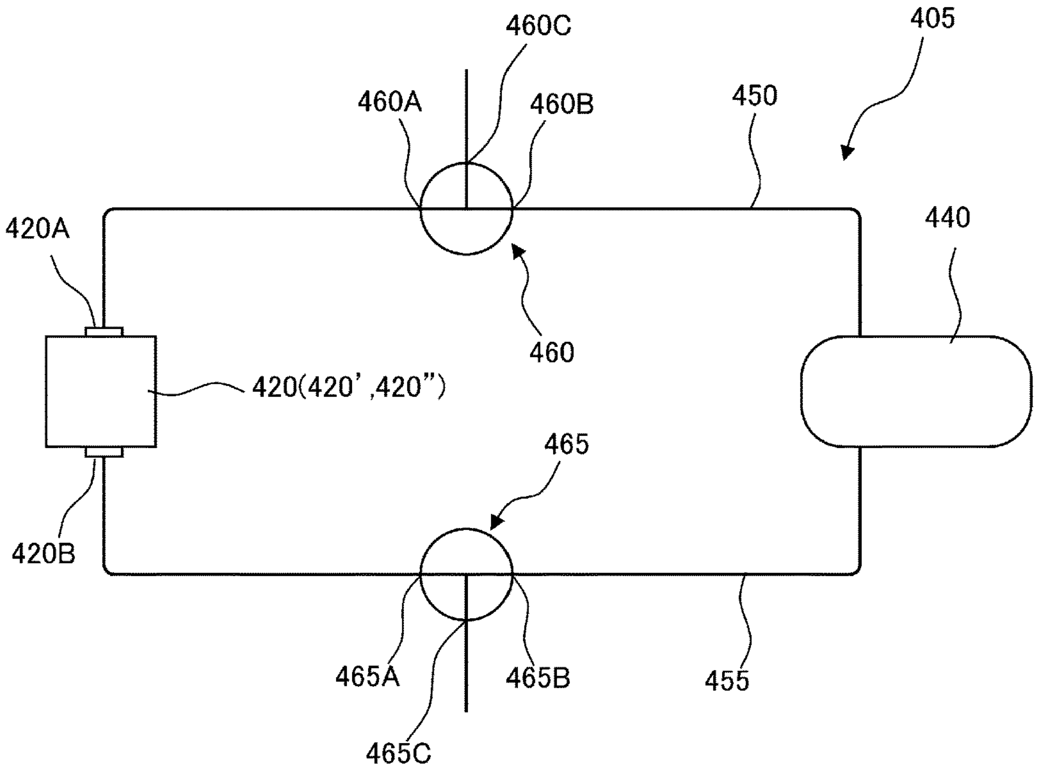

[Fig. 8]
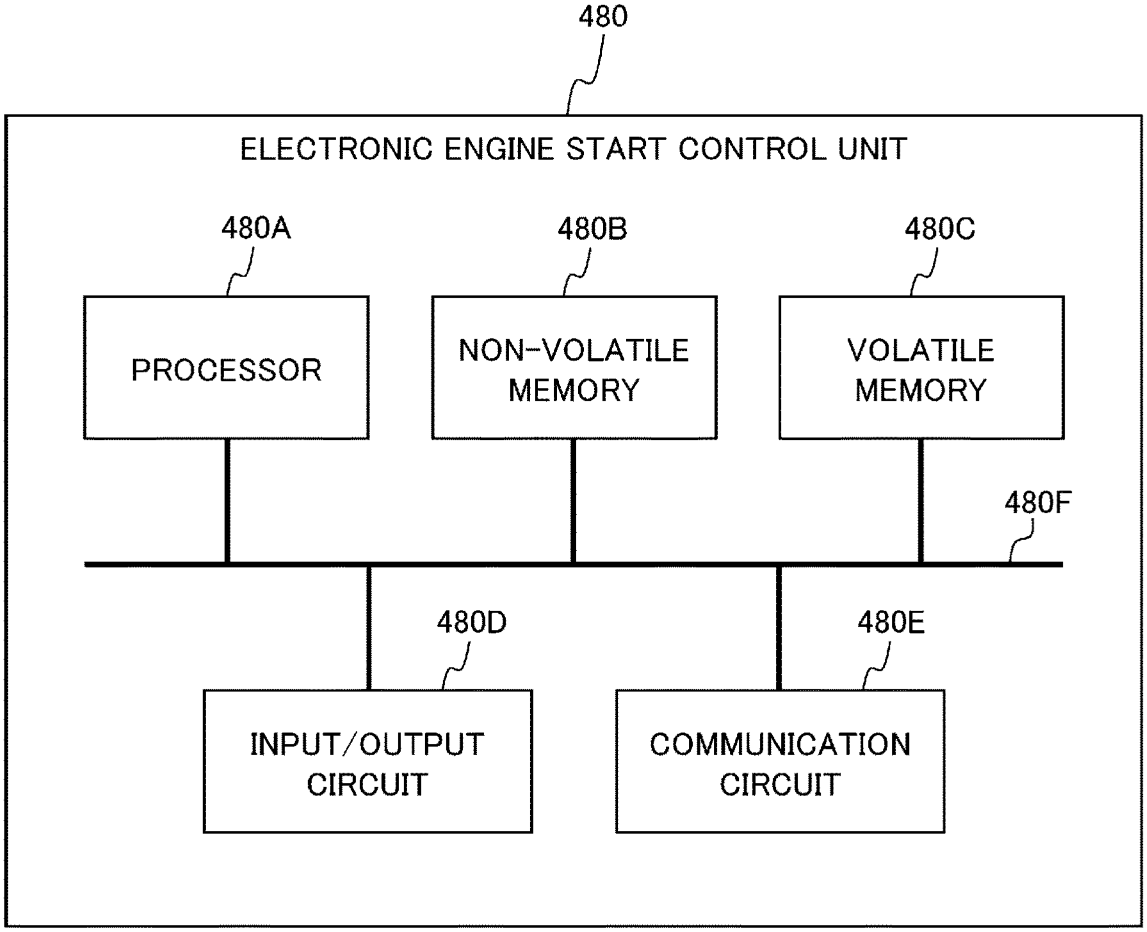

[Fig. 9]
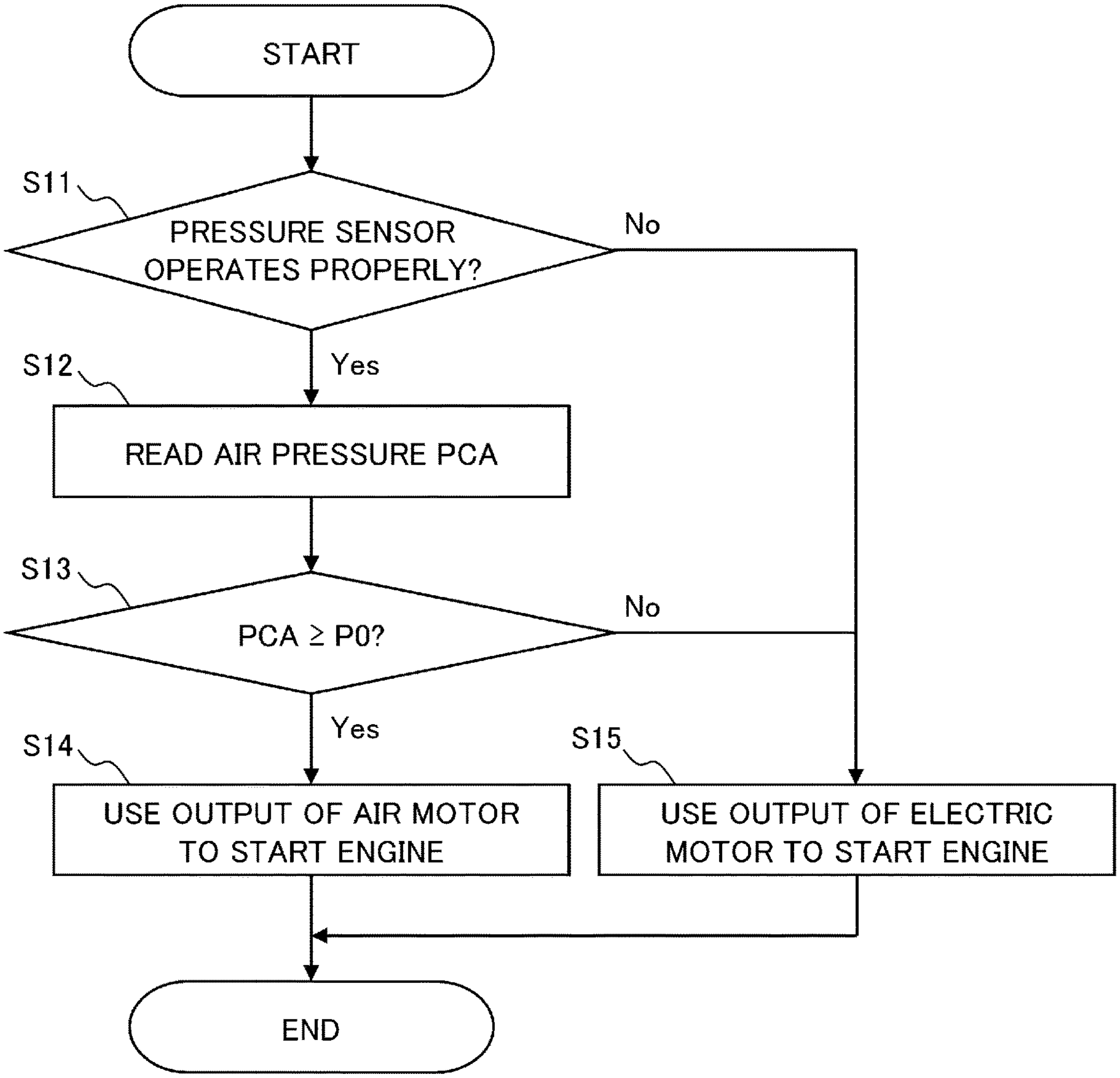

[Fig. 10]
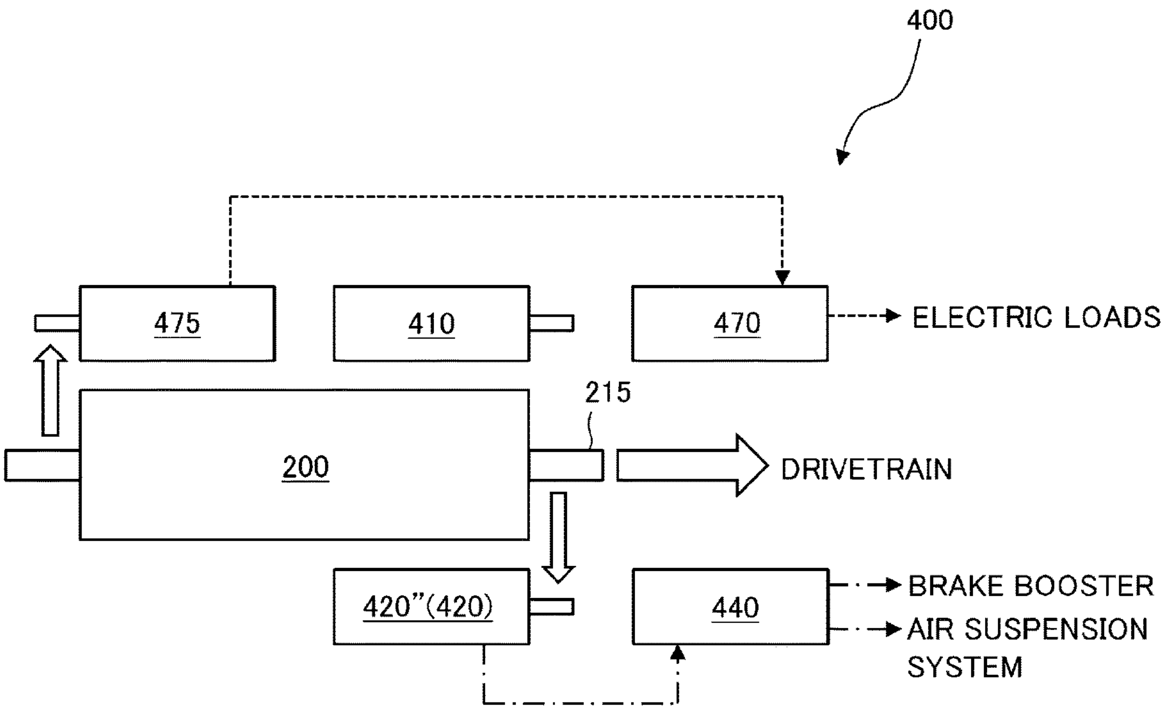
[Fig. 11]
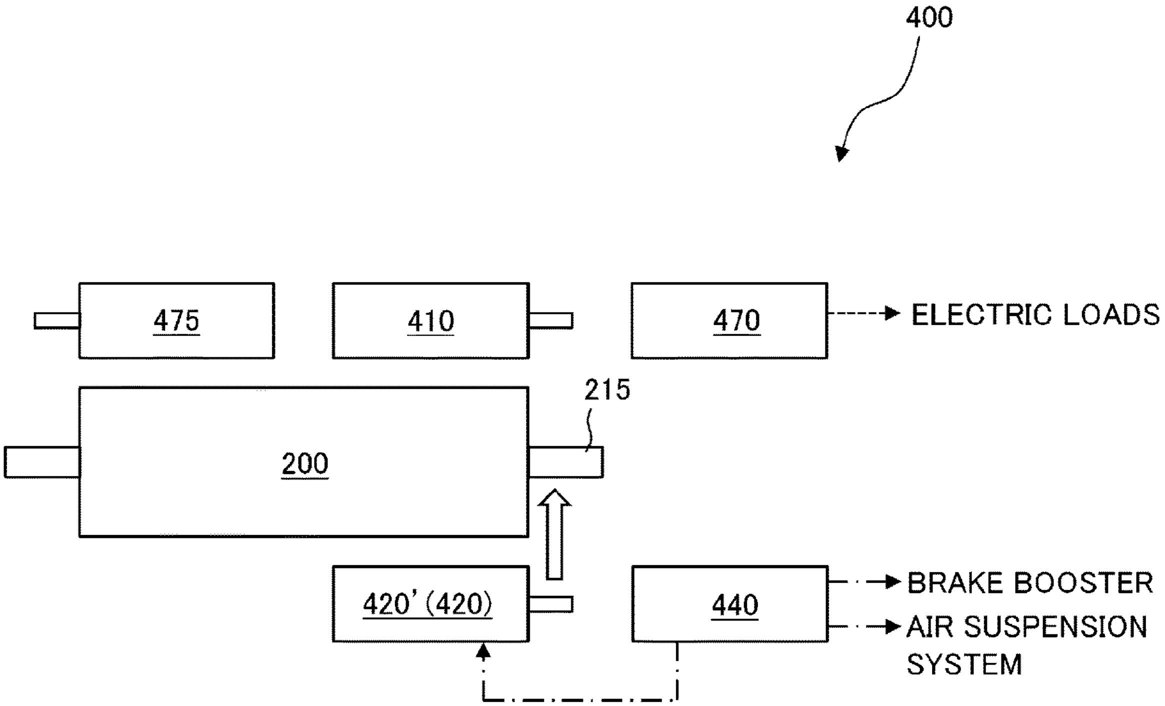

[Fig. 12]
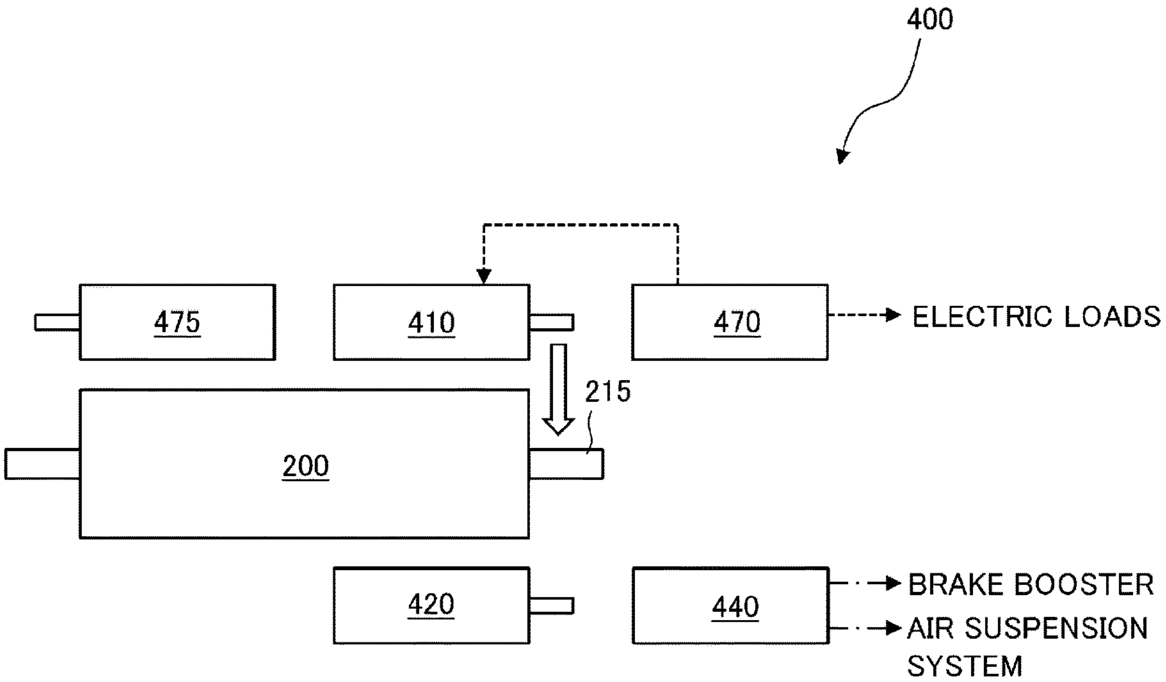

[Fig. 13]
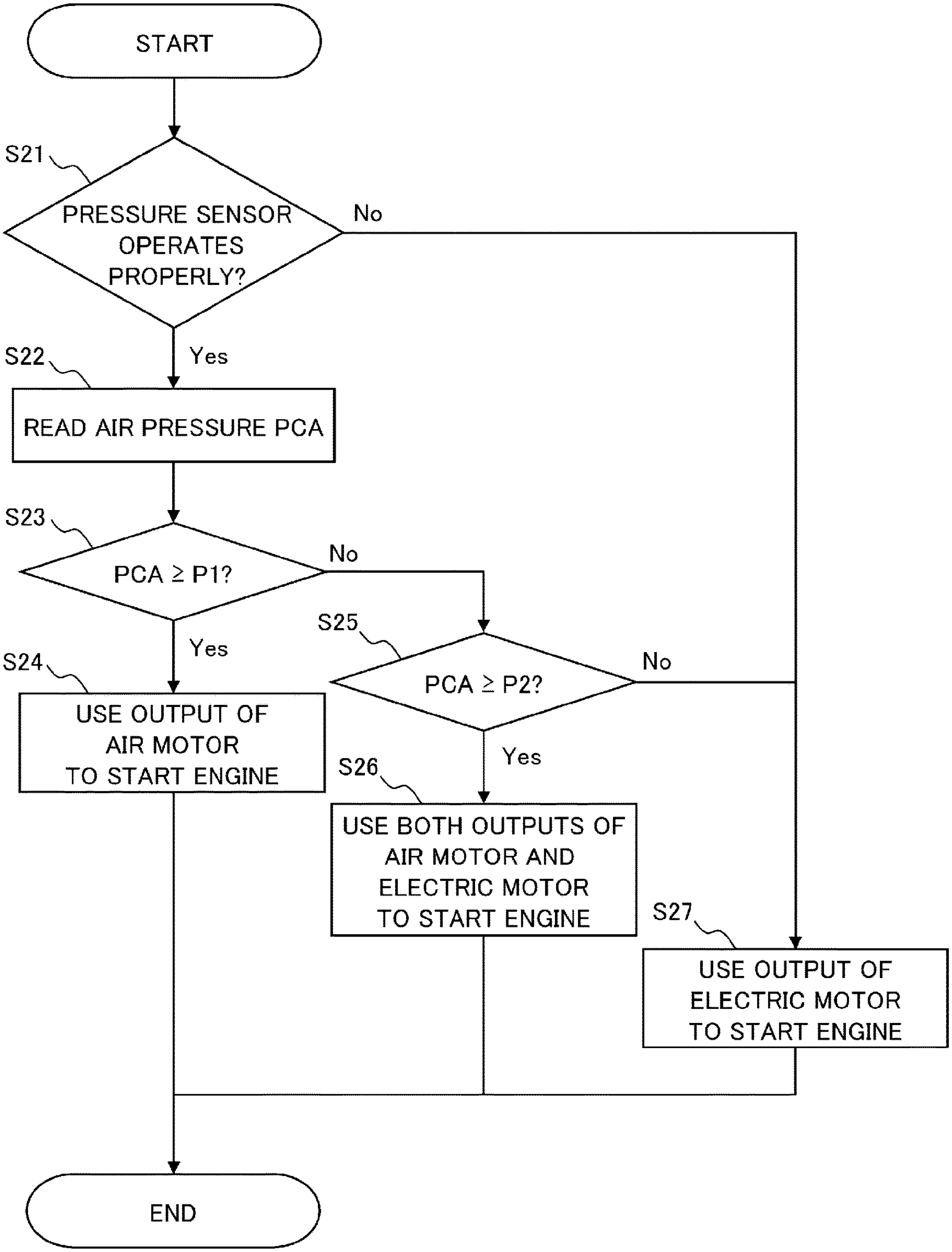

[Fig. 14]
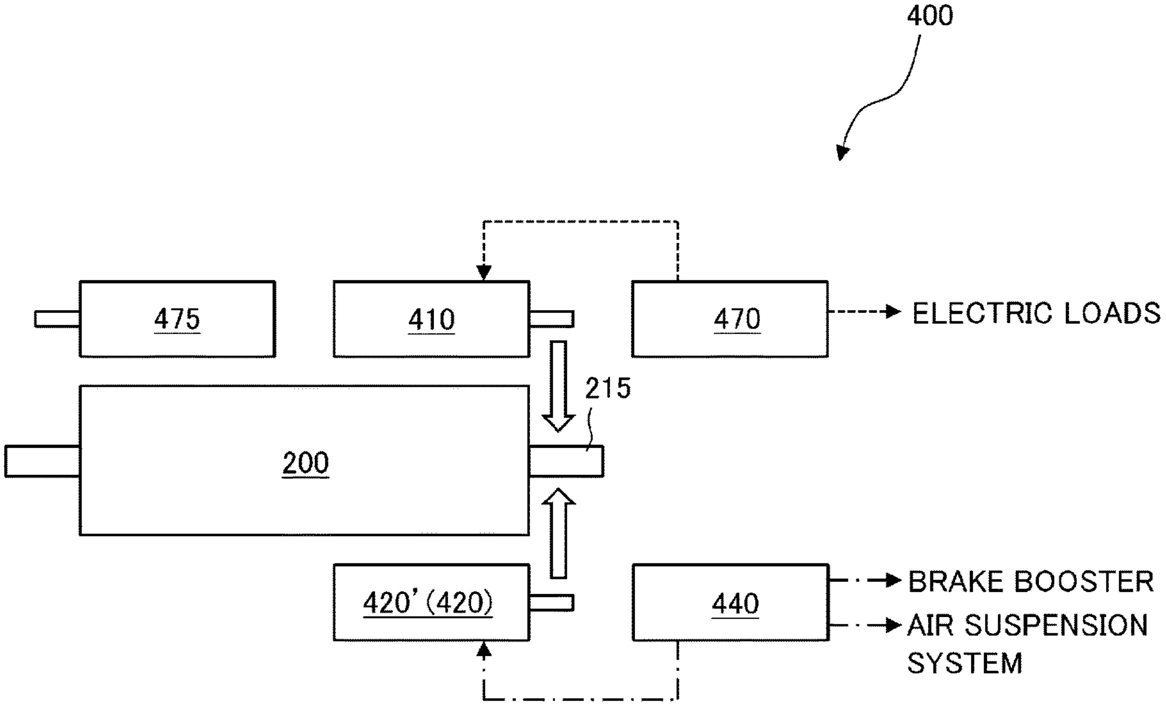

CONTROL METHOD, CONTROLLER, AND CONTROL PROGRAM FOR CONTROLLING STARTING SYSTEM, COMPUTER-READABLE MEDIUM CARRYING CONTROL PROGRAM, STARTING SYSTEM, AND VEHICLE

CROSS-REFERENCE TO RELATED APPLICATIONS

This application is a U.S. National Stage application of PCT/JP2020/033623, filed Sep. 4, 2020 and published on Mar. 10, 2022, as WO 2022/049730, all of which is hereby incorporated by reference in its entirety.

TECHNICAL FIELD

The present invention relates to a control method, a controller, and a control program for controlling a starting system of an engine mounted on a vehicle, and a computer-readable medium carrying the control program. Furthermore, the present invention also relates to a starting system of an engine mounted on a vehicle, and a vehicle equipped with the starting system.

BACKGROUND ART

Recently, many vehicles are equipped with an idle reduction (idle stop) system configured to stop the engine when the vehicle is parked, stopped, or waiting for a traffic light so as to achieve fuel saving and emission reduction. For example, such an idle reduction system is configured to detect a decrease in vehicle speed or the like and stop the engine, and then to detect a driver's vehicle start operation or the like and start (restart) the engine. An electric motor (starter motor) driven by electric power from the battery may be used to start the engine. JP 6537661 B (PTL1) discloses an example of a vehicle equipped with such an idle reduction system.

CITATION LIST

Patent Literature

PTL 1: JP 6537661 B

SUMMARY OF INVENTION

Technical Problem

When an engine is starting, a battery supplies electric power to the electric motor required to start the engine. On the other hand, while the engine is in operation, the battery stores electric power generated by the alternator. Thus, in vehicles equipped with an idle reduction system, the charging and discharging of the battery tends to be frequently repeated, and this may reduce the service life of the battery.

Therefore, an object of the present invention is to provide a control method, a controller, and a control program for controlling a starting system, and a computer-readable medium carrying the control program, which are capable of ensuring an extended service life of a battery of a vehicle. Another object of the present invention is to provide a starting system capable of ensuring an extended service life of a battery of a vehicle, and a vehicle equipped with the starting system.

Solution to Problem

A starting system of an engine mounted on a vehicle includes an air reservoir; an air motor driven by compressed air supplied from the air reservoir; a battery; an electric motor driven by electric power from the battery; and an electronic control unit. The electronic control unit performs the step of controlling the air motor and/or the electric motor so that the engine is started by at least one, determined in accordance with an air pressure in the air reservoir, of an output of the air motor and an output of the electric motor. A starting system control program includes a program code for performing the step of controlling the air motor and/or the electric motor so that the engine is started by at least one, determined in accordance with an air pressure in the air reservoir, of an output of the air motor and an output of the electric motor. A computer-readable medium carrying a starting system control program includes a program code for performing the step of controlling the air motor and/or the electric motor so that the engine is started by at least one, determined in accordance with an air pressure in the air reservoir, of an output of the air motor and an output of the electric motor. A vehicle is equipped with the starting system.

Advantageous Effects of Invention

According to the present invention, it is possible to reduce the frequency of charging and discharging the battery, thus extending the service life of the battery.

BRIEF DESCRIPTION OF DRAWINGS

FIG. 1 is a schematic diagram of an example of a vehicle to which the present invention is applicable.

FIG. 2 is a schematic diagram of an example of an engine.

FIG. 3 is a diagram illustrating an example of an electronic idle reduction control unit and an electronic engine start control unit.

FIG. 4 is a block diagram of an example of the electronic idle reduction control unit.

FIG. 5 is a flowchart illustrating an example of idle reduction control processing.

FIG. 6 shows an arrangement example of an air motor and an electric motor constituting a starting system.

FIG. 7 is a circuit diagram of an example of a pneumatic system constituting the starting system.

FIG. 8 is a block diagram showing an example of the electronic engine start control unit.

FIG. 9 is a flowchart illustrating an example of engine start control processing.

FIG. 10 shows an illustrative example of how torque, electric current, and compressed air flow while the engine is in operation.

FIG. 11 shows an illustrative example of how torque, electric current, and compressed air flow when the engine is started by the output of the air motor.

FIG. 12 shows an illustrative example of how torque, electric current, and compressed air flow when the engine is started by the output of the electric motor.

FIG. 13 is a flowchart illustrating another example of engine start control processing.

FIG. 14 shows an illustrative example of how torque, electric current, and compressed air flow when the engine is started by both the output of the air motor and the output of the electric motor.

DESCRIPTION OF EMBODIMENTS

Hereinafter, an embodiment for implementing the present invention will be described in detail with reference to the accompanying drawings.

FIG. 1 shows an example of a vehicle to which the present invention is applicable. The following description will be made using a truck 100 as an example of such a vehicle. However, the vehicle is not limited to the truck 100, and it may be another vehicle such as a bus, a passenger car, or a construction machine.

The truck 100 includes an engine 200, an idle reduction system 300, and a starting system 400 for the engine 200. The engine 200 is configured to drive rear wheels 120 by means of a clutch and a transmission (not shown). A diesel engine may be used as the engine 200 for the truck 100, but a gasoline engine may be used as the engine 200 for a passenger car or the like. The idle reduction system 300 is configured, for example, to detect a decrease in vehicle speed or the like and stop the engine, and then to detect a driver's vehicle start operation or the like and start (restart) the engine, so as to achieve fuel saving and emission reduction. The starting system 400 is configured to start the engine 200 from the engine stop.

As shown in FIG. 2, the engine 200 includes a cylinder block 205, pistons 210, a crankshaft 215, connecting rods 220, a cylinder head 225, a cylinder head cover 230, and an oil pan 235. The cylinder block 205 has cylinder bores 205A into which the pistons 210 are reciprocally fitted. The crankshaft 215 is disposed below the cylinder block 205 with bearings (not shown) interposed therebetween so as to be rotatable relative to the cylinder block 205. The pistons 210 are connected to the crankshaft 215 by means of the connecting rods 220 so as to be rotatable relative to the crankshaft 215.

The cylinder head 225 has intake ports 225A for introducing intake air and exhaust ports 225B for discharging exhaust gas. When the cylinder head 225 is fastened to the upper surface of the cylinder block 205, spaces are defined by the cylinder bores 205A of the cylinder block 205, the crown surfaces of the pistons 210, and the lower surface of the cylinder head 225. These spaces function as combustion chambers 240. Intake valves 250 configured to be opened and closed by an intake camshaft 245 are disposed at open ends, facing the combustion chambers 240, of the intake ports 225A. Exhaust valves 260 configured to be opened and closed by an exhaust camshaft 255 are disposed at open ends, facing the combustion chambers 240, of the exhaust ports 225B. In addition, fuel injectors 265 for injecting high-pressure fuel into the combustion chambers 240 are mounted at predetermined positions, facing the combustion chambers 240, of the cylinder head 225. As the fuel injectors 265, common rail fuel injectors may be used, for example.

The cylinder head cover 230 for covering the valvetrain including the intake camshaft 245 and the exhaust camshaft 255 is detachably fastened to the upper surface of the cylinder head 225. The oil pan 235 is configured to store a predetermined amount of lubricating oil OIL for lubricating components such as the bearings of the crankshaft 215, the pistons 210, and the valvetrain. The oil pan 235 is detachably fastened to the lower surface of the cylinder block 205.

As shown in FIG. 3, the idle reduction system 300 includes an electronic idle reduction control unit 310. When there is an idle reduction request, such as when the driver depresses the brake pedal and the vehicle speed falls to or below a predetermined vehicle speed, the electronic idle reduction control unit 310 outputs an engine stop command to the electronic engine control unit. Then, when there is an engine start request, such as when the driver releases the depression of the brake pedal, the electronic idle reduction control unit 310 outputs an engine start command (engine restart command) to an electronic engine start control unit 480. As shown in FIG. 4, the electronic idle reduction control unit 310 includes therein a processor 310A such as a central processing unit (CPU), a non-volatile memory 310B, a volatile memory 310C, an input/output circuit 310D, a communication circuit 310E, and an internal bus 310F for communicatively connecting these components with each other.

The processor 310A is hardware that executes a set of instructions (e.g., for data transfer, arithmetic processing, data processing, and data control and management) described in an application program (control program). The processor 310A includes an arithmetic unit, registers storing instructions and data, peripheral circuits, and the like. The non-volatile memory 310B is formed, for example, of a flash read only memory (ROM), which is capable of retaining data even after it is powered off. The non-volatile memory 310B retains an application program (control program) for implementing a control unit of the idle reduction system 300. The volatile memory 310C is formed, for example, of a dynamic random access memory (RAM), which loses data retained therein when it is powered off. The volatile memory 310C serves as a temporary storage area for data from arithmetic operations of the processor 310A.

The input/output circuit 310D includes an A/D converter, a D/A converter, a D/D converter, and the like. The input/output circuit 310D provides functionality to input and output analog and digital signals to external devices. The communication circuit 310E may include a controller area network (CAN) transceiver, for example. The communication circuit 310E provides functionality to connect to an on-board network of the vehicle. The internal bus 310F serves as a path for exchanging data between the components connected thereto. The internal bus 310F includes an address bus for transferring addresses, data bus for transferring data, and a control bus for exchanging control information and information on when to actually perform input/output operations through the address bus and/or the data bus.

As shown in FIG. 3, the electronic idle reduction control unit 310 receives, through the input/output circuit 310D, output signals from an idle reduction switch 320, a pedal stroke sensor 330, a vehicle speed sensor 340, and a state-of-battery sensor 350. The idle reduction switch 320 for selection to activate or deactivate the idle reduction system 300 as necessary is mounted at a position facing the driver's seat of the truck 100, for example. The idle reduction switch 320 outputs an "ON" signal to activate the idle reduction system 300 and outputs an "OFF" signal to deactivate the idle reduction system 300. The pedal stroke sensor 330 is mounted, for example, near the brake pedal and outputs a brake pedal position POS. The vehicle speed sensor 340 is mounted, for example, to the output shaft of the transmission and outputs a vehicle speed VSP. The state-of-battery sensor 350 measures and outputs various conditions (state of battery) SBA of a battery 470 (see FIGS. 10 to 12). The state of battery SBA includes, but is not limited to, the charge rate, the discharge performance, and the state of charge of the battery 470.

FIG. 5 shows an example of idle reduction control processing triggered by the activation of the electronic idle reduction control unit 310 and is repeatedly performed by the processor 310A at predetermined time intervals in accordance with the application program (control program) stored in the non-volatile memory 310B.

In step 1 (abbreviated as "S1" in FIG. 5, the same applies to the other steps below), the processor 310A reads the output signal from the idle reduction switch 320 and determines whether the idle reduction switch 320 is ON. When the processor 310A determines that the idle reduction switch 320 is ON, i.e., determines activation of the idle reduction system 300 (Yes), the operation proceeds to step 2. When the processor 310A determines that the idle reduction switch 320 is OFF, i.e., determines deactivation of the idle reduction system 300 (No), the idle reduction control processing ends.

In step 2, the processor 310A reads the output signals from, for example, the pedal stroke sensor 330, the vehicle speed sensor 340, and the state-of-battery sensor 350, and determines whether there is an idle reduction request to stop the engine 200 which is currently in operation. When the processor 310A determines that there is an idle reduction request (Yes), the operation proceeds to step 3. When the processor 310A determines that there is no idle reduction request (No), the idle reduction control processing ends.

In step 2, the processor 310A determines that there is an idle reduction request and the truck 100 is in condition for idle reduction, when it determines that the following conditions (1) to (3) are satisfied, for example:

(1) The brake pedal is depressed (The processor 310A is able to determine whether the brake pedal is depressed, based on the brake pedal position POS);

(2) The vehicle speed VSP is equal to or less than a predetermined vehicle speed (The predetermined vehicle speed is a threshold for determining whether the truck 100 has substantially stopped. For example, the predetermined vehicle speed may be defined in consideration of the resolution of the vehicle speed sensor 340 and/or the like. The predetermined vehicle speed may be set to zero); and (3) The state of battery SBA is sufficient to perform idle reduction.

In step 3, the processor 310A outputs the engine stop command to the electronic engine control unit. Upon receiving the engine stop command, the electronic engine control unit stops the engine 200 by, for example, controlling the fuel injectors 265 as appropriate.

In step 4, the processor 310A reads the output signals from, for example, the pedal stroke sensor 330 and the state-of-battery sensor 350 and determines whether there is an engine start request. When the processor 310A determines that there is an engine start request (Yes), the operation proceeds to step 5. When the processor 310A determines that there is no engine start request (No), the processor 310A waits until there is an engine start request.

In step 4, the processor 310A determines that there is an engine start request and the truck 100 is in condition for engine start, when it determines that at least one of the following conditions (4) and (5) is satisfied, for example:

(4) The depression of the brake pedal is released (The processor 310A is able to determine whether the depression of the brake pedal is released, based on the brake pedal position POS); and (5) The state of battery SBA indicates that the battery 470 requires immediate charging.

In step 5, the processor 310A outputs the engine start command (engine restart command) to the electronic engine start control unit 480 in the electronic engine control unit. Upon receiving the engine start command, the electronic engine start control unit 480 starts (restarts) the engine 200 by controlling the fuel injectors 265 and the starting system 400 as appropriate. After that, the idle reduction control processing ends.

According to the idle reduction control processing described above, when the idle reduction switch 320 is ON, the following operations are performed. When there is an idle reduction request while the engine is in operation, the engine stop command is output to the electronic engine control unit. Then, when there is an engine start request (engine restart request) after that, the engine start command (engine restart command) is output to the electronic engine start control unit 480 in the electronic engine control unit. As such, the idle reduction control processing described above enables fuel saving and emission reduction by stopping the engine 200 when the truck 100 is parked, stopped, or waiting for a traffic light. It should be noted that the above example of the idle reduction control processing is merely an illustrative example outlining the idle reduction control processing.

As shown in FIGS. 6, 7, and 10 to 12, the starting system 400 includes an electric motor (starter motor) 410, an air device 420, an air reservoir (reservoir tank) 440, the battery 470, and an alternator 475. The electric motor 410 is driven by electric power from the battery 470. The battery 470 is configured to store electric power generated by the alternator 475 while the engine 200 is in operation. The electric power stored in the battery 470 may be supplied to various electrical loads. The air reservoir 440 is configured to store compressed air. The compressed air stored in the air reservoir 440 may be supplied to the brake booster, the air suspension system, and the like.

The air device 420 has two switchable operating modes: an air motor mode for operating as an air motor 420'; and an air compressor mode for operating as an air compressor 420". In other words, the air device 420 is configured to operate as the air motor 420' when it is in the air motor mode, and also to operate as the air compressor 420" when it is in the air compressor mode. The air device 420 may be a reciprocating, vane, or axial air device, for example. The air device 420, which is operable both as the air motor 420' and the air compressor 420", may be implemented using a well-known technique (see JP H02-298664 A, for example). As such, the configuration of the air device 420 will not be described in detail herein.

When the air device 420 operates as the air motor 420' at the start of the engine 200, the air motor 420' is driven by compressed air from the air reservoir 440. On the other hand, when the air device 420 operates as the air compressor 420" while the engine 200 is in operation, the air compressor 420" supplies compressed air into the air reservoir 440. In other words, regarding the air device 420, it can be understood that the air motor 420' is configured to function as the air compressor 420" while the engine 200 is in operation. Furthermore, regarding the air device 420, it can be understood that the air compressor 420" is configured to function as the air motor 420' at the start of the engine 200.

As shown in FIG. 6, a ring gear 275 is fitted onto a flywheel 270 disposed at one end of the crankshaft 215. When the engine 200 is started by the output of the electric motor 410, which is a starter motor, a pinion 415 disposed at an end of the output shaft of the motor 410 advances and engages with the ring gear 275. As a result, the rotational driving force of the electric motor 410 is transmitted to the crankshaft 215 through the pinion 415, the ring gear 275, and the flywheel 270.

As shown in FIG. 6, a gear 280 is attached at the one end of the crankshaft 215 so as to rotate integrally with the crankshaft 215. A gear 430 is disposed at an end of a shaft 425 of the air motor 420'. An idler gear 285 engages with the gears 280, 430. When the air device 420 operates as the air motor 420', the rotational driving force of the air motor 420' is transmitted to the crankshaft 215 through the shaft 425, the gear 430, the idler gear 285, and the gear 280. When the air device 420 operates as the air compressor 420", the rotational driving force of the engine 200 is transmitted to the shaft 425 of the air compressor 420" through the crankshaft 215, the gear 280, the idler gear 285, and the gear 430.

As shown in FIG. 7, a pneumatic system 405, which constitutes the starting system 400, includes a first pipe 450, a second pipe 455, a first switching valve 460, and a second switching valve 465, in addition to the air device 420 (air motor 420'/air compressor 420") and the air reservoir 440 described above. Each of the first switching valve 460 and the second switching valve 465 is a three-way valve, such as a 3-port solenoid valve.

The first pipe 450 connects an air inlet 420A of the air device 420 to the air reservoir 440. The first switching valve 460 is disposed at some midpoint of the first pipe 450. Specifically, connection ports 460A, 460B of the first switching valve 460 are connected to the first pipe 450.

The second pipe 455 connects an air outlet 420B of the air device 420 to the air reservoir 440. The second switching valve 465 is disposed at some midpoint of the second pipe 455. Specifically, connection ports 465A, 465B of the second switching valve 465 are connected to the second pipe 455.

To cause the air device 420 to operate as the air motor 420', the first switching valve 460 is positioned such that communication is established between the connection ports 460A, 460B, and a port 460C open to the atmosphere is closed. In addition, the second switching valve 465 is positioned such that communication is established between the connection port 465A and a port 465C open to the atmosphere, and the connection port 465B is closed. As a result, compressed air is supplied from the air reservoir 440 to the air device 420, which thus operates as the air motor 420'. After being used by the air motor 420', the air is discharged to the atmosphere through the second switching valve 465. At that time, communication between the second switching valve 465 and the air reservoir 440 is disconnected.

To cause the air device 420 to operate as the air compressor 420", the first switching valve 460 is positioned such that communication is established between the connection port 460A and the port 460C open to the atmosphere, and the connection port 460B is closed. In addition, the second switching valve 465 is positioned such that communication is established between the connection ports 465A, 465B, and the port 465C open to the atmosphere is closed. When the engine 200 is in operation under the above conditions, air entering through the port 460C is drawn into the air device 420 through the air inlet 420A, and is compressed by the air device 420 (air compressor 420"). Then, the compressed air discharged through the air outlet 420B flows through the connection ports 465A, 465B of the second switching valve 465, and is introduced into the air reservoir 440.

As shown in FIG. 3, the starting system 400 includes the electronic engine start control unit 480 (electronic control unit) for controlling the electric motor 410, the air device 420 (air motor 420'/air compressor 420"), the first switching valve 460, and the second switching valve 465. As shown in FIG. 8, the electronic engine start control unit 480 includes therein a processor 480A such as a CPU, a non-volatile memory 480B, a volatile memory 480C, an input/output circuit 480D, a communication circuit 480E, and an internal bus 480F for communicatively connecting these components with each other. Note that the configuration of the electronic engine start control unit 480 is basically the same as that of the electronic idle reduction control unit 310, and thus, will not be further described herein so as to avoid redundant description. Please also refer to the above description for the electronic idle reduction control unit 310, if necessary.

As shown in FIG. 3, the electronic engine start control unit 480 receives, through the input/output circuit 480D, an output signal from a pressure sensor 490 configured to measure an air pressure PCA in the air reservoir 440. Through the communication circuit 480E that provides connection, for example, to a CAN (controller area network) 500, the electronic engine start control unit 480 is communicatively connected to the electronic idle reduction control unit 310 and the like.

The electronic engine start control unit 480 controls the air motor 420' (air device 420), the first switching valve 460, the second switching valve 465, and/or the electric motor 410 such that the engine 200 is started by at least one, determined in accordance with the air pressure PCA in the air reservoir 440 measured by the pressure sensor 490, of the output of the air motor 420' (air device 420) and the output of the electric motor 410.

FIG. 9 shows an example of engine start control processing for starting the engine 200 performed by the processor 480A in accordance with the application program (control program) stored in the non-volatile memory 480B. The processor 480A is triggered to perform the engine start control processing when the electronic engine start control unit 480 receives the engine start command (engine restart command) output in step 5 in the above example of the idle reduction control processing. Here, at the start of the engine start control processing, the air device 420 is in the air compressor mode, i.e., the air device 420 is set to be operable as the air compressor 420".

In step 11, the processor 480A determines whether the pressure sensor 490 operates properly by using, for example, a self-diagnostic function implemented in the electronic engine start control unit 480. When the processor 480A determines that the pressure sensor 490 operates properly (Yes), the operation proceeds to step 12. When the processor 480A determines that the pressure sensor 490 does not operate properly (No), the operation proceeds to step 15.

In step 12, the processor 480A reads the air pressure PCA in the air reservoir 440 from the pressure sensor 490.

In step 13, the processor 480A determines whether or not the air pressure PCA is below a predetermined threshold P0. The predetermined threshold P0 is previously defined to determine whether the engine 200 can be started by the output of the air motor 420'. When the processor 480A determines that the air pressure PCA is not below the predetermined threshold P0 (Yes), the operation proceeds to step 14. When the processor 480A determines that the air pressure PCA is below the predetermined threshold P0 (No), the operation proceeds to step 15.

In step 14, the processor 480A switches the air device 420 from the air compressor mode to the air motor mode so that the air device 420 becomes operable as the air motor 420' and uses the output of the air motor 420' to start the engine 200. Specifically, the processor 480A controls the first switching valve 460 such that communication is established between the connection ports 460A, 460B, and the port 460C open to the atmosphere is closed. In addition, the processor 480A controls the second switching valve 465 such that communication is established between the connection port 465A and the port 465C open to the atmosphere, and the connection port 465B is closed. This causes compressed air to be supplied from the air reservoir 440 to the air motor 420', thereby activating the air motor 420'. Thus, in step 14, by controlling the first switching valve 460 and the second switching valve 465, the processor 480A controls the air motor 420' such that the engine 200 is started by the output of the air motor 420'. In step 14, the electric motor 410 is turned off. Then, (by controlling the first switching valve 460 and the second switching valve 465,) the processor 480A switches the air device 420 from the air motor mode to the air compressor mode so that the air device 420 becomes operable as the air compressor 420". After that, the engine start control processing ends.

In step 15, the processor 480A uses the output of the electric motor 410 to start the engine 200. In other words, in step 15, the processor 480A controls the electric motor 410 such that the engine 200 is started by the output of the electric motor 410. In step 15, the air device 420 is maintained in the air compressor mode. After that, the engine start control processing ends.

According to the engine start control processing described above, the output of the air motor 420' may be used to start the engine 200. This reduces the frequency of charging and discharging the battery 470, thus extending the service life of the battery 470.

FIG. 10 shows an illustrative example of how torque, electric current, and compressed air flow while the engine 200 is in operation. FIG. 11 shows an illustrative example of how torque, electric current, and compressed air flow when the engine 200 is started by the output of the air motor 420' (air device 420). FIG. 12 shows an illustrative example of how torque, electric current, and compressed air flow when the engine 200 is started by the output of the electric motor 410. In each of FIGS. 10 to 12, the blank arrow indicates a torque flow, the dashed arrow indicates an electric current flow, and the dashed-dotted arrow indicates a compressed air flow. FIGS. 11 and 12 correspond to steps 14 and 15 described above, respectively.

As shown in FIG. 10, while the engine 200 is in operation, the output of the engine 200 is used not only to drive the truck 100, but also to put the alternator 475 and the air compressor 420" (air device 420) into operation. While the alternator 475 is in operation, it charges the battery 470. While the air compressor 420" (air device 420) is in operation, it supplies compressed air into the air reservoir 440.

As shown in FIG. 11, when the engine 200 is being started by the output of the air motor 420' (air device 420), the air motor 420' (air device 420) operates using compressed air from the air reservoir 440.

As shown in FIG. 12, when the engine 200 is being started by the output of the electric motor 410, the electric motor 410 operates using electric power from the battery 470.

FIG. 13 shows another example of engine start control processing for starting the engine 200 performed by the processor 480A in accordance with the application program (control program) stored in the non-volatile memory 480B. The processor 480A is triggered to perform the engine start control processing when the electronic engine start control unit 480 receives the engine start command (engine restart command) output in step 5 in the above example of the idle reduction control processing. Here, at the start of the engine start control processing, the air device 420 is in the air compressor mode, i.e., the air device 420 is set to be operable as the air compressor 420".

In step 21, the processor 480A determines whether the pressure sensor 490 operates properly by using, for example, a self-diagnostic function implemented in the electronic engine start control unit 480. When the processor 480A determines that the pressure sensor 490 operates properly (Yes), the operation proceeds to step 22. When the processor 480A determines that the pressure sensor 490 does not operate properly (No), the operation proceeds to step 27.

In step 22, the processor 480A reads the air pressure PCA in the air reservoir 440 from the pressure sensor 490.

In step 23, the processor 480A determines whether or not the air pressure PCA is below a first predetermined threshold P1. The first predetermined threshold P1 is previously defined to determine whether the engine 200 can be started solely by the output of the air motor 420'. When the processor 480A determines that the air pressure PCA is not below the first predetermined threshold P1 (Yes), the operation proceeds to step 24. When the processor 480A determines that the air pressure PCA is below the first predetermined threshold P1 (No), the operation proceeds to step 25.

In step 24, the processor 480A switches the air device 420 from the air compressor mode to the air motor mode so that the air device 420 becomes operable as the air motor 420' and uses the output of the air motor 420' to start the engine 200. Specifically, the processor 480A controls the first switching valve 460 and the second switching valve 465 as in step 14 described above. This causes compressed air to be supplied from the air reservoir 440 to the air motor 420', thereby activating the air motor 420'. Thus, in step 24, by controlling the first switching valve 460 and the second switching valve 465, the processor 480A controls the air motor 420' such that the engine 200 is started by the output of the air motor 420'. In step 24, the electric motor 410 is turned off. Then, (by controlling the first switching valve 460 and the second switching valve 465) the processor 480A switches the air device 420 from the air motor mode to the air compressor mode so that the air device 420 becomes operable as the air compressor 420". After that, the engine start control processing ends.

In step 25, the processor 480A determines whether or not the air pressure PCA is below a second predetermined threshold P2. The second predetermined threshold P2 is previously defined to determine whether the engine 200 can be started by the output of the air motor 420' with the assistance of the output of the electric motor 410. The second predetermined threshold P2 is set to a value lower than that of the first predetermined threshold P1. When the processor 480A determines that the air pressure PCA is not below the second predetermined threshold P2 (Yes), the operation proceeds to step 26. When the processor 480A determines that the air pressure PCA is below the second predetermined threshold P2 (No), the operation proceeds to step 27.

In step 26, the processor 480A switches the air device 420 from the air compressor mode to the air motor mode so that the air device 420 becomes operable as the air motor 420' and uses the combination of the output of the air motor 420' and the output of the electric motor 410 to start the engine 200. Specifically, the processor 480A controls the first switching valve 460 and the second switching valve 465 as in step 14 described above. This causes compressed air to be supplied from the air reservoir 440 to the air motor 420', thereby activating the air motor 420'. Thus, in step 26, by controlling the first switching valve 460, the second switching valve 465, and the electric motor 410, the processor 480A controls the air motor 420' and the electric motor 410 in parallel such that the engine 200 is started by both the output of the air motor 420' and the output of the electric motor 410. Then, (by controlling the first switching valve 460 and the second switching valve 465,) the processor 480A switches the air device 420 from the air motor mode to the air compressor mode so that the air device 420 becomes operable as the air compressor 420". After that, the engine start control processing ends.

In step 27, the processor 480A uses the output of the electric motor 410 to start the engine 200. In other words, in step 27, the processor 480A controls the electric motor 410 such that the engine 200 is started by the output of the electric motor 410. In step 27, the air device 420 is maintained in the air compressor mode. After that, the engine start control processing ends.

According to the engine start control processing described above, the output of the air motor 420' alone or the combination of the output of the air motor 420' and the output of the electric motor 410 may be used to start the engine 200. This reduces the frequency of charging and discharging the battery 470 and/or the amount of discharge from the battery 470, thus extending the service life of the battery 470.

FIG. 14 shows an illustrative example of how torque, electric current, and compressed air flow when the engine 200 is started by both the output of the air motor 420' (air device 420) and the output of the electric motor 410. In FIG. 14, the blank arrow indicates a torque flow, the dashed arrow indicates an electric current flow, and the dashed-dotted arrow indicates a compressed air flow. FIG. 14 corresponds to step 26 described above.

As shown in FIG. 14, when the engine 200 is being started by both the output of the air motor 420' (air device 420) and the output of the electric motor 410, the air motor 420' (air device 420) operates using compressed air from the air reservoir 440 and the electric motor 410 operates using electric power from the battery 470 in a parallel manner.

In an aspect according to this embodiment, a starting system control method for controlling a starting system 400 of an engine 200 mounted on a truck 100, which is an example of a vehicle, is provided. Here, the starting system 400 includes an air reservoir 440, an air motor 420' driven by compressed air supplied from the air reservoir 440, a battery 470, an electric motor 410 driven by electric power from the battery 470, and an electronic engine start control unit 480 (electronic control unit). The method includes the step (steps 13 to 15 and 23 to 27), performed by the electronic engine start control unit 480, of: controlling the air motor 420' and/or the electric motor 410 so that the engine 200 is started by at least one, determined in accordance with an air pressure PCA in the air reservoir 440, of an output of the air motor 420' and an output of the electric motor 410. The method allows reducing the frequency of charging and discharging the battery 470 and/or the amount of discharge from the battery 470, thus extending the service life of the battery 470.

Furthermore, in another aspect according to this embodiment, in the step of controlling the air motor 420' and/or the electric motor 410 (steps 13 to 15): when the air pressure PCA in the air reservoir 440 is equal to or greater than a predetermined threshold P0, the air motor 420' is controlled so that the engine 200 is started by the output of the air motor 420' (steps 13 and 14); and when the air pressure PCA in the air reservoir 440 is less than the predetermined threshold P0, the electric motor 410 is controlled so that the engine 200 is started by the output of the electric motor 410 (steps 13 and 15). This reduces the frequency of charging and discharging the battery 470, thus extending the service life of the battery 470.

Furthermore, in another aspect according to this embodiment, in the step of controlling the air motor 420' and/or the electric motor 410 (steps 23 to 27): when the air pressure PCA in the air reservoir 440 is equal to or greater than a first predetermined threshold P1, the air motor 420' is controlled so that the engine 200 is started by the output of the air motor 420' (steps 23 and 24); when the air pressure PCA in the air reservoir 440 is less than a second predetermined threshold P2 that is lower than the first predetermined threshold P1, the electric motor 410 is controlled so that the engine 200 is started by the output of the electric motor 410 (steps 23, 25, and 27); and when the air pressure PCA in the air reservoir 440 is less than the first predetermined threshold P1 and equal to or greater than the second predetermined threshold P2, the air motor 420' and the electric motor 410 are controlled so that the engine 200 is started by both the output of the air motor 420' and the output of the electric motor 410 (steps 23, 25, and 26). This reduces the amount of discharge from the battery 470 of charging and discharging the battery 470, thus extending the service life of the battery 470.

Furthermore, in another aspect according to this embodiment, the air motor 420' is configured, when the engine 200 is in operation, to function as an air compressor 420" that supplies compressed air to the air reservoir 440. In other words, the air device 420 is configured to operate as the air motor 420' when it is in the air motor mode, and also to operate as the air compressor 420" when it is in the air compressor mode. Thus, the starting system 400 uses fewer components than other comparable systems each including an air motor and an air compressor separated from each other.

Furthermore, in another aspect according to this embodiment, a truck 100, which is an example of a vehicle, is equipped with an idle reduction system 300, and the engine 200 is stopped by the idle reduction system 300 before the engine 200 is started (steps 3 to 5). This reduces the frequency of charging and discharging the battery 470 in the truck 100 equipped with the idle reduction system 300.

Furthermore, in another aspect according to this embodiment, the idle reduction system 300 includes an idle reduction switch 320 (switch) for selecting whether to activate or deactivate the idle reduction system 300, and the step of controlling the air motor 420' and/or the electric motor 410 (steps 13 to 15, and 23 to 27) is performed by the electronic engine start control unit 480 (electronic control unit) when the idle reduction switch 320 is operated to select to activate the idle reduction system 300 (step 1). This allows the driver to select whether to activate idle reduction control.

Furthermore, in another aspect according to this embodiment, the air pressure PCA in the air reservoir 440 is measured by a pressure sensor 490. The step of controlling the air motor 420' and/or the electric motor 410 (steps 13 to 15, and 23 to 27) is performed by the electronic engine start control unit 480 (electronic control unit) when the pressure sensor 490 operates properly (steps 11 and 21). When the pressure sensor 490 does not operate properly, the electric motor 410 may be controlled so that the engine 200 is started by the output of the electric motor 410.

Furthermore, in another aspect according to this embodiment, the electronic engine start control unit 480 (starting system controller) for controlling the starting system 400 may be configured to perform the step according to any of the above aspects. In another aspect according to this embodiment, a starting system control program for controlling the starting system 400 may include a program code which, when executed on a computer, causes the computer to perform the step according to any of the above aspects. In another aspect according to this embodiment, a computer-readable medium carrying a starting system control program for controlling the starting system 400 may include a program code which, when executed on a computer, causes the computer to perform the step according to any of the above aspects.

Furthermore, in another aspect according to this embodiment, a starting system 400 of an engine 200 mounted on a truck 100, which is an example of a vehicle, includes: an air reservoir 440; an air motor 420' driven by compressed air supplied from the air reservoir 440; a battery 470; an electric motor 410 driven by electric power from the battery 470; and an electronic engine start control unit 480 (electronic control unit) configured to control the air motor 420' and/or the electric motor 410 so that the engine 200 is started by at least one, determined in accordance with an air pressure PCA in the air reservoir 440, of an output of the air motor 420' and an output of the electric motor 410. The configuration allows reducing the frequency of charging and discharging the battery 470, thus extending the service life of the battery 470.

The application program (control program) may be stored in a computer-readable medium such as an SD (secure digital) card or a USB (universal serial bus) memory and sold commercially. As an alternative, the application program (control program) may be stored in a storage at a node connected to the Internet or the like and distributed from this node. In this case, the storage at the node is understood to be an example of the computer-readable medium.

It should be noted that one skilled in the art can easily understand that some of the technical features in the above embodiment may be omitted, replaced with one or more well-known technical features, and/or combined with one or more well-known technical features to provide various alternative embodiments.

For example, although the electronic engine start control unit 480 is incorporated in the electronic engine control unit in the above embodiment, the electronic engine start control unit 480 may be incorporated in an electronic control unit other than the electronic engine control unit. As another alternative, the electronic engine start control unit 480 may be a separate unit from the electronic engine control unit.

Furthermore, the idle reduction control processing may further include, before step 2, an additional step in which the processor 310A determines whether the air pressure PCA in the air reservoir 440 measured by the pressure sensor 490 is not below a predetermined threshold P3. In this alternative idle reduction control processing, when the processor 310A determines that the air pressure PCA is not below the predetermined threshold P3 (Yes), the operation may proceed to step 2. When the processor 310A determines that the air pressure PCA is below the predetermined threshold P3 (No), the idle reduction control processing may end. It is preferable that the predetermined threshold P3 be substantially equal to or lower than the predetermined threshold P0 described above. Furthermore, it is also preferable that the predetermined threshold P3 be substantially equal to or lower than the second predetermined threshold P2.

Alternatively or additionally, the idle reduction control processing may further include, before step 2, an additional step in which the processor 310A determines whether the pressure sensor 490 operates properly by using, for example, a self-diagnostic function implemented in the electronic idle reduction control unit 310. In this alternative idle reduction control processing, when the processor 310A determines that the pressure sensor 490 operates properly (Yes), the operation may proceed to step 2. When the processor 310A determines that the pressure sensor 490 does not operate properly (No), the idle reduction control processing may end.

Furthermore, the air motor 420' included in the starting system 400 does not have to have the functionality to operate as the air compressor 420". In other words, the air motor 420' and the air compressor 420" may be separate devices from each other.

Furthermore, instead of reading the brake pedal position POS from the pedal stroke sensor 330 and the vehicle speed VSP from the vehicle speed sensor 340, the electronic idle reduction control unit 310 may acquire the brake pedal position POS and the vehicle speed VSP through, for example, communication with another electronic control unit.

Furthermore, the starting system 400 and the engine start control processing described above may not only be used to start (restart) the engine 200 after the engine 200 is stopped by the idle reduction system 300, but may also be applied to normal startup of the engine 200.

REFERENCE SIGNS LIST

100 Truck (Vehicle)
200 Engine
300 Idle reduction system
310 Electronic idle reduction control unit
320 Idle reduction switch
400 Starting system
405 Pneumatic system
410 Electric motor
420 Air device
420' Air motor
420" Air compressor
440 Air reservoir
450 First pipe
455 Second pipe
460 First switching valve
465 Second switching valve
470 Battery
475 Alternator
480 Electronic engine start control unit (Electronic control unit)
490 Pressure sensor

The invention claimed is:

1. A starting system control method for controlling a starting system of an engine mounted on a vehicle, the starting system including an air reservoir, an air motor driven by compressed air supplied from the air reservoir, a battery, an electric motor driven by electric power from the battery, and an electronic control unit, the method comprising the step, performed by the electronic control unit, of:

controlling the air motor and/or the electric motor so that the engine is started by at least one, determined in accordance with an air pressure in the air reservoir, of an output of the air motor and an output of the electric motor, wherein when the air pressure in the air reservoir is equal to or greater than a predetermined threshold, the air motor is controlled so that the engine is started by the output of the air motor, and when the air pressure in the air reservoir is less than the predetermined threshold, the electric motor is controlled so that the engine is started by the output of the electric motor.

2. The starting system control method according to claim 1, wherein the air motor is configured, when the engine is in operation, to function as an air compressor that supplies compressed air to the air reservoir.

3. The starting system control method according to claim 1, wherein the vehicle is equipped with an idle reduction system, and wherein the engine is stopped by the idle reduction system before the engine is started.

4. The starting system control method according to claim 3, wherein the idle reduction system includes a switch for selecting whether to activate or deactivate the idle reduction system, and wherein the step of controlling the air motor and/or the electric motor is performed by the electronic control unit when the switch is operated to select to activate the idle reduction system.

5. The starting system control method according to claim 1, wherein the air pressure in the air reservoir is measured by a pressure sensor.

6. The starting system control method according to claim 5, wherein the step of controlling the air motor and/or the electric motor is performed by the electronic control unit when the pressure sensor operates properly.

7. A starting system controller configured to perform the step according to claim 1.

8. A starting system control program comprising a program code which, when executed on a computer, causes the computer to perform the steps according to claim 1.

9. A computer-readable medium carrying a starting system control program comprising a program code which, when executed on a computer, causes the computer to perform the steps according to claim 1.

10. A starting system of an engine mounted on a vehicle, the starting system comprising:

an air reservoir;

an air motor driven by compressed air supplied from the air reservoir;

a battery;

an electric motor driven by electric power from the battery; and an electronic control unit configured to control the air motor and/or the electric motor so that the engine is started by at least one, determined in accordance with an air pressure in the air reservoir, of an output of the air motor and an output of the electric motor, when the air pressure in the air reservoir is equal to or greater than a predetermined threshold, the air motor is controlled so that the engine is started by the output of the air motor, and when the air pressure in the air reservoir is less than the predetermined threshold, the electric motor is controlled so that the engine is started by the output of the electric motor.

11. A vehicle equipped with the starting system according to claim 10.

12. A starting system control method for controlling a starting system of an engine mounted on a vehicle, the starting system including an air reservoir, an air motor driven by compressed air supplied from the air reservoir, a battery, an electric motor driven by electric power from the battery, and an electronic control unit, the method comprising the step, performed by the electronic control unit, of:

controlling the air motor and/or the electric motor so that the engine is started by at least one, determined in accordance with an air pressure in the air reservoir, of an output of the air motor and an output of the electric motor, wherein, in the step of controlling the air motor and/or the electric motor, when the air pressure in the air reservoir is equal to or greater than a first predetermined threshold, the air motor is controlled so that the engine is started by the output of the air motor, when the air pressure in the air reservoir is less than a second predetermined threshold that is lower than the first predetermined threshold, the electric motor is controlled so that the engine is started by the output of the electric motor, and when the air pressure in the air reservoir is less than the first predetermined threshold and equal to or greater than the second predetermined threshold, the air motor and the electric motor are controlled so that the engine is started by both the output of the air motor and the output of the electric motor.

* * * * *